INVENTORS
EVERETT G. FAHLMAN
SIDNEY W. JACKSON
BY Evans + McCoy
ATTORNEYS

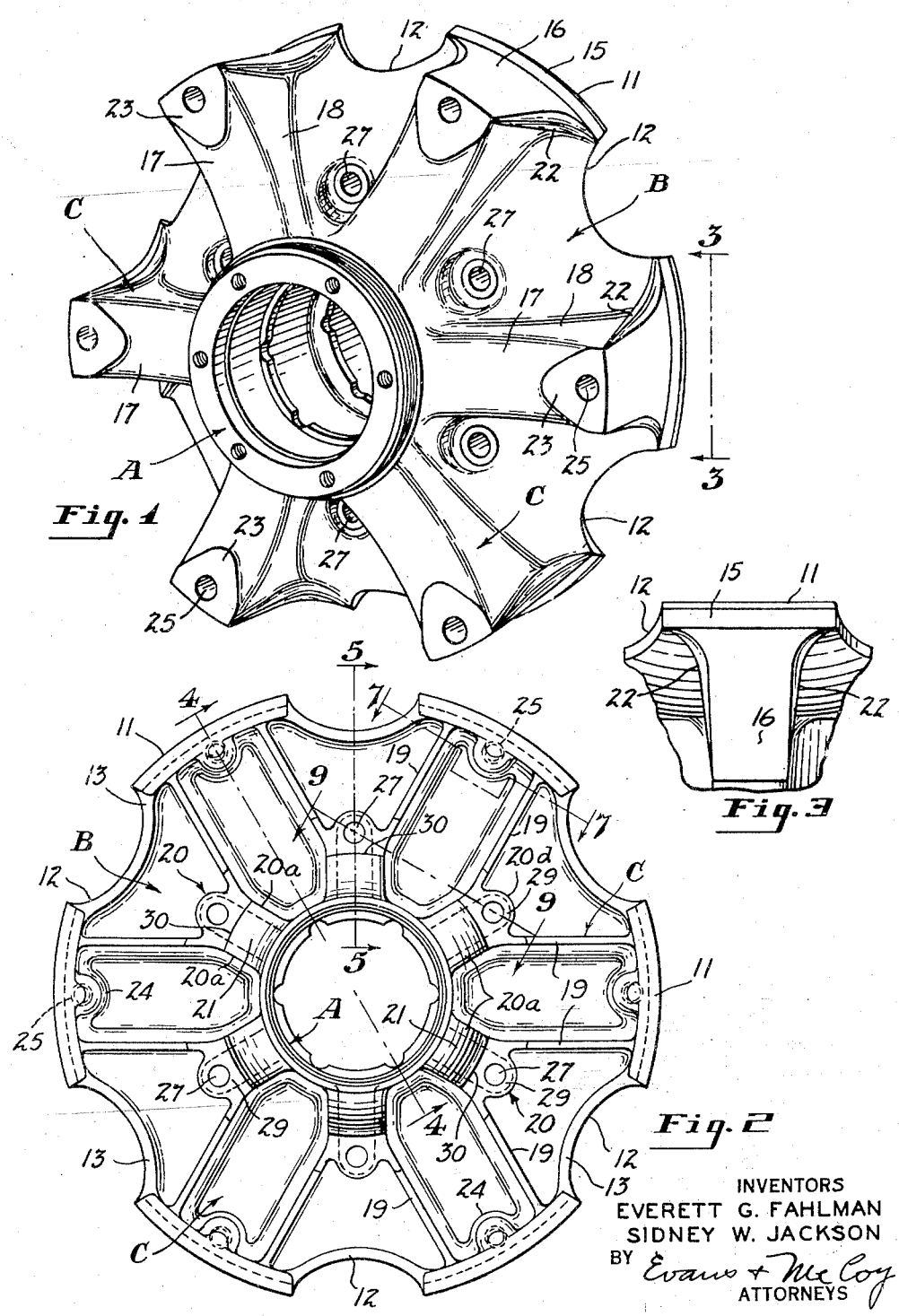

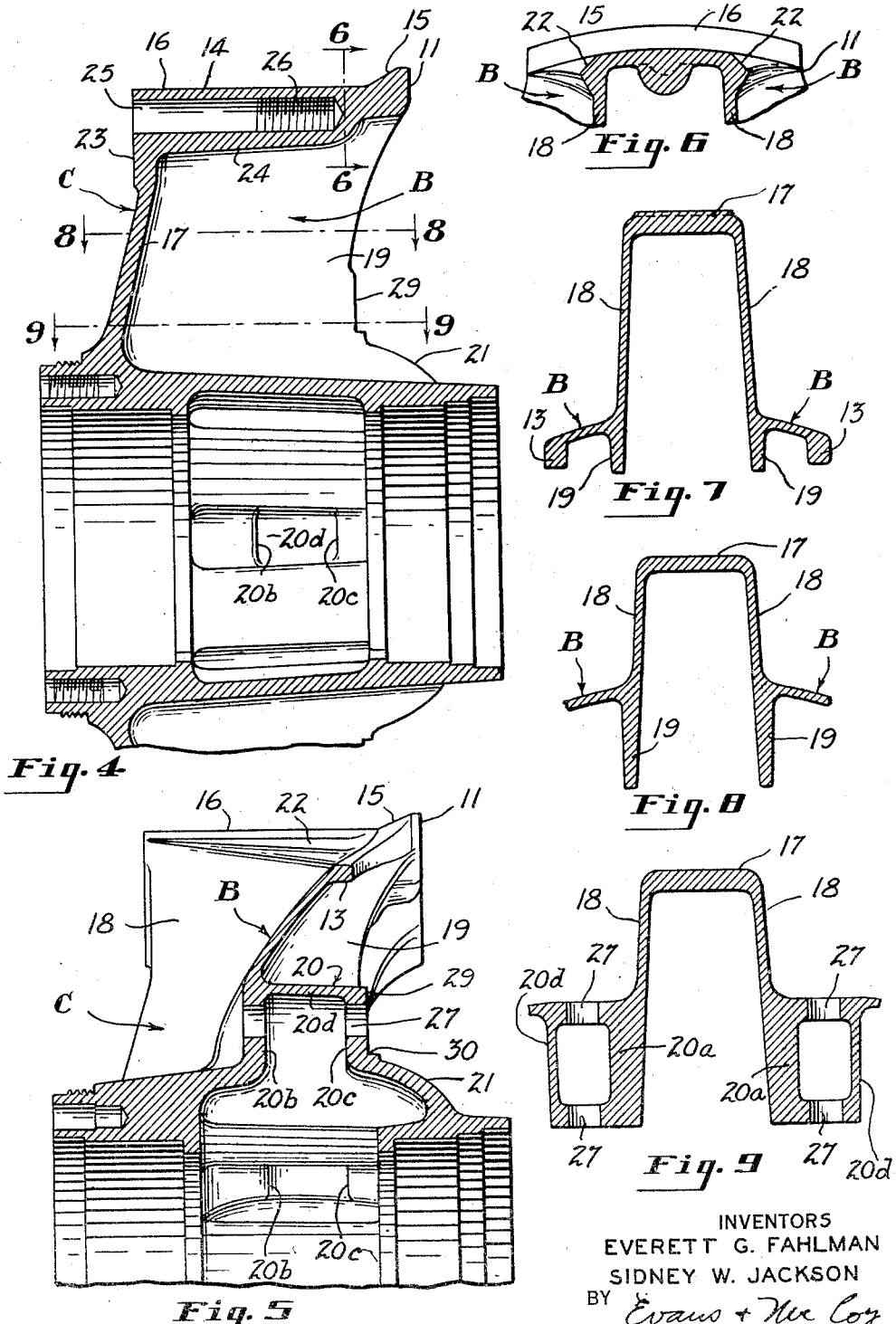

United States Patent Office 2,819,118
Patented Jan. 7, 1958

2,819,118

CAST METAL DUAL TIRE WHEELS

Everett G. Fahlman and Sidney W. Jackson, Medina, Ohio, assignors to The Permold Company, Medina, Ohio, a corporation of Ohio Application June 23, 1954, Serial No. 438,758

9 Claims. (Cl. 301—13)

This invention relates to cast metal dual tire wheels and more particularly to such cast metal wheels made of a light metal alloy.

The wheel of the present invention is a combined spoke and disk wheel in which the hub, spokes and disk are formed integrally, in which the tire rims are mounted upon the spoke ends and in which the spokes and intervening integrally joined segments of the disk are so shaped and disposed that they effectively brace the spokes in such manner as to enable them to withstand the severe strains to which they are subjected in service.

The disk, which is of generally spherical contour, has its periphery at the inner edges of the spoke ends, slants axially outwardly from its periphery across a center plane of the wheel spokes which is perpendicular to the wheel axis and which may be termed the median plane of the wheel, and is integrally joined to the hub axially outwardly of said median plane. The spokes, which are formed integrally with the disk and hub, are channel shaped in cross section and are disposed with their open sides facing inwardly. The outer ends of the spokes extend axially outwardly from the disk periphery and, radially inwardly of their ends, the spokes have portions disposed axially outwardly of the disk and portions disposed axially inwardly of the disk. The portions of the spokes axially outwardly of the disk are channel shaped continuations of the disk, which are integrally joined to the hub axially outwardly of the disk, and the portions of the spokes that are disposed axially inwardly of the disk are in the form of webs integral with the disk and projecting axially inwardly therefrom to form the inner portions of the side walls of the channel shaped spokes.

The invention has for its main object to provide a light cast metal dual tire wheel of superior strength in which the tire carrying rims are mounted on the spoke ends and in which the spokes are so braced by an integral disk that they effectively withstand the severe stresses to which they are subjected in service.

Reference should be had to the accompanying drawings forming a part of this specification in which:

Figure 1 is a perspective view of the wheel body looking toward the outer face thereof;

Fig. 2 is an elevation looking toward the inner side of the wheel;

Fig. 3 is a fragmentary top plan view of one of the spoke ends;

Fig. 4 is a fragmentary section on an enlarged scale taken on the line indicated at 4—4 in Fig. 2;

Fig. 5 is a fragmentary section on the same scale as Fig. 4, taken on the line indicated at 5—5 in Fig. 2;

Fig. 6 is a fragmentary vertical section taken on the line indicated at 6—6 in Fig. 4;

Fig. 7 is a transverse section through the outer end portion of the spoke taken on the line indicated at 7—7 in Fig. 2;

Fig. 8 is a transverse section through a spoke substantially midway between its ends, taken on the line indicated at 8—8 in Fig. 4;

Fig. 9 is a transverse section through the inner end portion of the spoke, taken on the line indicated at 9—9 in Fig. 4.

Figure 10:
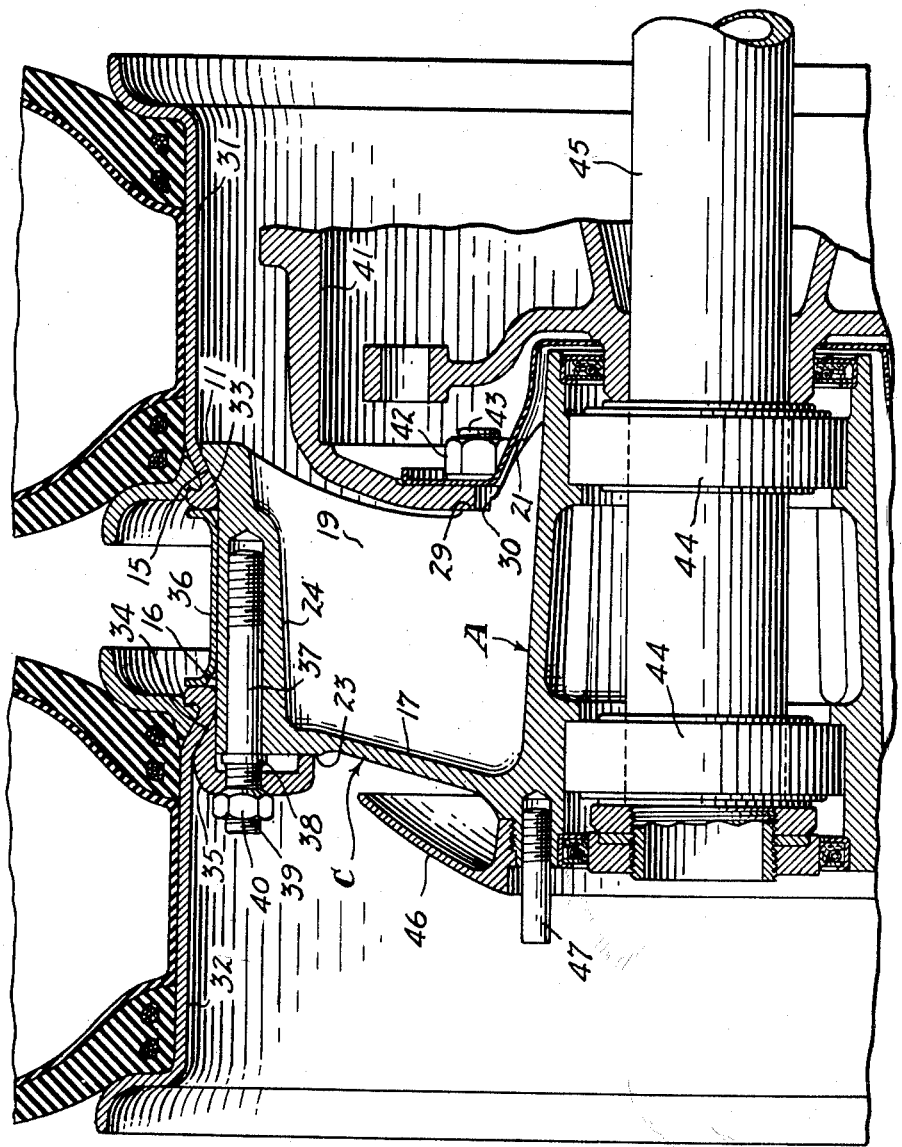
Fig. 10 is a fragmentary sectional view showing the wheel body mounted on an axle and tires mounted on the wheel body.

The wheel of the present invention has a hub A and a disk B and spokes C that are cast integral with one another and with the hub. Though the disk B is actually composed of a plurality of disk segments separated from each other by the integrally connected spokes C, the disk segments are collectively referred to in this description as a unit wherever this contributes to simplicity of the description. The disk B is a dished disk of substantially spherical contour that has its periphery at the inner edges of the outer ends of the spokes C and that slants outwardly from its periphery to the hub. The disk crosses the median plane of the wheel and is joined to the hub A axially outwardly of said median plane. The spokes C have portions disposed on opposite sides of the disk and are integrally joined to the hub A both inwardly of the disk and outwardly of the disk.

The disk B serves as a sort of diagonal brace for the wheel body, strengthening the wheel and stiffening the spokes to more effectively resist axial thrusts exerted either inwardly or outwardly in the direction of the wheel axis. The periphery of the wheel is provided with thickened portions 11 forming rim seating ledges that extend along the inner edges of the outer or peripheral ends of the wheel spokes C, the ledges 11 projecting radially a short distance past the ends of the spokes. The portions 11 of the wheel periphery are of a circumferential length greater than the width of the spokes and project past opposite sides of each of the spokes. Intermediate the thickened peripheral portions 11 the disk is provided with scallops 12 which are radially shallow and which are of less circumferential extent than the portions 11. The scallops 12 permit passage of air through the peripheral portions of the wheel inwardly of the tire supporting rims and provide openings through which the valve stem of the inner of the dual tires may extend.

The reentrant portions of the disk periphery formed by the scallops 12 are thickened to provide a bead 13 on the inner face of the disk extending between the thickened peripheral portions 11 of the wheel. The thickened bead 13 provides additional strength at the peripheral edge of the disk to resist strains which tend to start cracks at the margin of the disk.

Each of the spokes C has an end wall 14 that extends axially outwardly from the thickened peripheral portion 11 of the disk. Each portion 11 has a tapered outwardly facing rim seat 15 thereon and the spoke end walls 14 provide seating faces 16 that conform to a cylindrical surface of revolution and upon which the tire carrying rims have a sliding fit. Each of the channel shaped spokes C has an outer or bottom wall 17 that extends from the outer edge of the end wall 14 of the spoke to the hub A and which is disposed at a small angle to planes that are normal to the wheel axis. Each of the spokes has side wall portions 18 that connect the outer walls 17 to the disk B and which are continuations of the disk. The outer walls 17 of the spokes are joined to the hub a short distance axially outwardy of the radially inner portion of the disk B and the side wall portions 18 are also integrally joined to the hub outwardly of the disk.

The inner portions of the side walls of the channel shaped spokes are formed by webs 19 which are integral with the disk B and which extend axially inwardly from the disk and in substantially coplanar alignment with the outer portions 18 of the side walls of the spokes. The axial width of the webs 19 increases from the wheel periphery toward the hub as shown in Figs. 7, 8 and 9. Inside the channel shaped spokes, adjacent the hub A, the outer and inner side wall portions 18 and 19 converge toward the wheel axis as shown in Fig. 2. Each pair of webs 19 that form opposed faces of adjoining spokes converge toward the wheel axis and are integrally joined at their inner ends to and merge with the side walls 20a of a hollow radial projection 20 formed integrally with the hub axially inwardly of the disk B and opening to the interior of the hub. The hub projections 20 provide the hub with attaching portions to which a brake drum can be rigidly secured and these hub projections, being formed integrally with the disk and with the spoke side walls, also serve to strengthen the wheel body.

The hollow hub projections 20 are identical and uniformly spaced around the hub, each having side walls 20a that are disposed in planes substantially parallel to and at equal distances from a plane defined by the wheel axis and by a radius bisecting the angle between two adjacent spokes as shown in Fig. 2. The side walls 20a of the hub projections are integrally joined to the disk B and extend axially inwardly therefrom. The side walls 20a of each hub projection are also integrally joined to the webs 19 that form portions of the side walls of two adjacent spokes. The side walls 20a are somewhat thicker than the webs 19 and form converging extensions thereof that are integral with the hub. The hub projections 20 have axially outer, axially inner, and radially outer walls 20b, 20c and 20d that are integral with the side walls 20a and that with the side walls 20a enclose a cavity that opens to the interior of the wheel hub. The walls 20b are flat inset portions of the disk B that form recessed bolt seats as shown in Fig. 5. The walls 20c and 20d bridge the spaces between the radially inner ends of adjacent spokes and stiffen the wheel body adjacent the hub. In order to more effectively brace the wheel body against axial inward thrusts, inner end portions of the hub projections 20 extend axially to provide inclined bracing portions 21.

As shown in Figs. 1, 3 and 6, axially extending tapering ribs 22 are provided along opposite sides of the spokes at their outer ends. These ribs are provided in order to avoid the formation of sharp edges at the ends of the spokes when the spoke ends are machined to provide seats for the tire carrying rims. The ribs 22 have slanting top faces which provide blunt obtuse angled edges at opposite sides of the rim seating end faces of the spokes which have greater resistance to stresses tending to start cracks in the edges of the spoke ends than would right angled edges.

Each of the spokes has a boss 23 at the peripheral end of its outer face which reinforces the spoke end and provides a seating face for a rim clamp. Each of the spoke end walls 14 is provided with an axially extending boss 24 on the inner side thereof that extends axially from the front wall 17 to adjacent the inner edge of the end wall. Each of these bosses is provided with a stud receiving bore 25 which has an internally threaded portion 26 at its inner end.

Each of the projections 20 is provided with an axially alined bolt receiving opening 27 in the axially outer and inner walls 20b and 20c. The inner faces of the walls 20c are machined to provide brake drum seating faces 29 and to provide ledges 30 across the walls 20c which provide relatively wide centering shoulders for a brake drum. The ledges 30 are disposed closely adjacent the bracing portions 21 of the hub projections and these projections extend axially inwardly a substantial distance past the webs 19 and past the periphery of the disk B.

The wheel of the present invention is adapted to be cast in a permanent mold, all of the cavities that require core members except those of the hollow hub projections 20 opening to the inner side of the wheel and being formed to flare inwardly so that suitable metal core members can be used and withdrawn axially. The cavities of the hub projections 20 may be conveniently formed by means of cores that are removable through the hub openings. Such cores may be sand cores or if desired collapsible metal cores.

As shown in Fig. 10, the wheel of the present invention supports an inner tire carrying rim 31 and an outer tire carrying rim 32. The inner rim 31 has a slanting radially inwardly projecting shoulder portion 33 at its outer edge which fits upon the rim seats 15 at the inner edges of the spokes. The outer rim 32 has a slanting radially inwardly projecting shoulder 34 at its inner edge which is engaged by clamps 35. These radially inwardly projecting edge portions of the rims 31 and 32 have a sliding fit on the seating faces 16 of the spokes and are held in proper spaced relation by means of a cylindrical spacer 36 that fits on the spoke end faces 16. The rim 32 is pressed inwardly against the spacer 36 by the clamps 35 and the spacer 36 presses the inner rim 31 against the seats 15. The clamps 35 are mounted on studs 37 that are screwed into the threaded portions 26 at the inner ends of the bosses 24 and each of the studs has a flange 38 that engages the face of the boss 23. Each clamp 35 is slidable on its stud 37 and each stud has a threaded outer end 39 which receives a nut 40 to press the clamp 35 against the shoulder 34 of the rim 32. By providing the threaded connection between the stud 37 and the boss 24 at the inner end of the stud receiving bore 25, the tension stresses to which the studs are subjected are transmitted to relatively unstressed portions of the wheel body so that the wheel body is protected against damage due to stresses on the clamp carrying studs. By mounting the studs 37 in bosses formed on the radially inner sides of the spoke end walls, it is possible to position the clamp holding studs quite close to the seating faces of the spokes so that a more direct thrust is obtained on the clamps to more securely hold them in place.

A brake drum 41 is clamped against the inner end faces 29 of the bosses 20 by nuts 42 on bolts 43 that extend through the alined holes 27 in the outer and inner walls of the hub projections 20. The brake drum disk is provided with a central circular opening, the margin of which seats upon the ledges 30 to accurately position and rigidly support the drum. The wheel is supported on suitable anti-friction bearings 44 interposed between the hub A and a tubular axle housing 45. A hub cap 46 may be mounted on the outer end of the hub and driving studs 47 may be attached to the outer end of the hub to provide the conventional driving connection between the wheel body and an axle shaft (not shown) in the housing 45.

Because of the fact that only the peripheral end portions of the spokes are disposed outwardly of the spherical disk and because of the fact that the outer wall of each spoke is nearly perpendicular to the axis of the hub, the loads imposed on the spokes through the outer rim are adequately supported and stresses tending to rupture the wheel are effectively absorbed.

An advantageous feature of the present invention is that the dual rims are very rigidly supported against any angular displacement on the wheel body. The rim seats at the inner edges of the peripheral ends of the spokes are circumferentially wide, they are rigidly supported both by the spokes and by the spherical disk upon which they are integrally formed. The outer portions of the spokes provide a rigid support for the outer rim and these portions of the spokes are rigidly supported to resist any stresses tending to cause angular deflection of the outer rim because of the fact that the spokes are effectively braced by the disk, the outer portions of the spokes being in the form of short cantilever arms which have great rigidity because of the bracing action of the disk.

Another advantageous feature of the wheel of the present invention is that it provides effective cooling of the brake drum. Portions of the wheel spokes that project outwardly from the outer face of the disk act as fan blades, forcing air over the outer face of the disk toward the periphery of the wheel and against the interior of the outer rim 32 and the spacer 36, and through the openings provided by the scallops 12 to the interior of the wheel and across the periphery of the brake drum. The bead 13 along the edges of the scallops is formed on the interior of the disk so that the exterior surface of the disk is smooth, and permits free flow of air through the openings formed by the scallops to the interior of the wheel.

It is to be understood that in accordance with the provisions of the patent statutes, variations and modifications of the specific devices herein shown and described may be made without departing from the spirit of the invention.

What we claim is:

1. A light metal alloy dual tire wheel having inner and outer sides and comprising, as an integral casting, a tubular hub and a wheel body extending radially outwardly from and circumferentially about the hub, said body including a multiplicity of spokes in the form of channels opening to the inner side of the wheel and extending radially from the hub, and intervening webs in the form of outwardly convex generally spheroidal segments extending radially outwardly from the hub and connecting adjacent spokes for resisting tangential forces on the spokes, the peripheral ends of said spoke channels being closed by end walls forming a multiplicity of circumferentially spaced rim seating surfaces conforming to a cylindrical surface of revolution, said web segments, adjacent the spokes, being joined to side walls of adjacent spoke channels from the hub to the outer end walls of the spokes along lines extending generally arcuately and obliquely across a plane that is normal to the wheel axis and midway between the inner and outer edges of said rim seating surfaces, so that the web segments form braces extending diagonally from the hub to the peripheral end walls of the spokes for stiffening the spokes against axially directed forces, the portions of each side wall of each spoke channel on opposite sides of said web segments being substantially in coplanar alignment and both of said portions extending uninterruptedly from the hub to said end walls of the spokes to provide substantially aligned inner and outer stiffening wall portions extending from the hub to said end walls of the spokes to resist both radially directed forces on the spokes on either side of said median plane and axially directed forces on the spokes.

2. A light metal alloy dual tire wheel having inner and outer sides and comprising, as an integral casting, a tubular hub and a wheel body extending radially outwardly from and circumferentially about the hub, said body including a multiplicity of spokes in the form of channels opening to the inner side of the wheel and extending radially from the hub, and intervening webs in the form of outwardly convex generally spheroidal segments extending radially outwardly from the hub and connecting adjacent spokes for resisting tangential forces on the spokes, the peripheral ends of said spoke channels being closed by end walls forming a multiplicity of circumferentially spaced rim seating surfaces conforming to a cylindrical surface of revolution, said web segments, adjacent the spokes being joined to side walls of adjacent spoke channels from the hub to the outer end walls of the spokes along lines extending generally arcuately and obliquely across a median plane that is normal to the wheel axis and midway between the inner and outer edges of said rim seating surfaces, so that the web segments form braces extending diagonally from the hub to the peripheral end walls of the spokes for stiffening the spokes against axially directed forces, the portions of each side wall of each spoke channel on opposite sides of said web segments being substantially in coplanar alignment and both of said portions extending uninterruptedly from the hub to said end walls of the spokes to provide substantially aligned inner and outer stiffening wall portions extending from the hub to said end walls of the spokes to resist both radially directed forces on the spokes on either side of said median plane and axially directed forces on the spokes, and the bottom walls of the spoke channels over their entire length from the hub to the ends of the spokes being spaced axially outwardly beyond said median plane.

3. A light metal alloy dual tire wheel having inner and outer sides and comprising, as an integral casting, a tubular hub and a wheel body extending radially outwardly from and circumferentially about the hub, said body including a multiplicity of spokes in the form of channels opening to the inner side of the wheel and extending radially from the hub, and intervening webs in the form of outwardly convex generally spheroidal segments extending radially outwardly from the hub and connecting adjacent spokes for resisting tangential forces on the spokes, the peripheral ends of said spoke channels being closed by end walls forming a multiplicity of circumferentially spaced rim seating surfaces conforming to a cylindrical surface of revolution, said web segments, adjacent the spokes, being joined to side walls of adjacent spoke channels from the hub to the outer end walls of the spokes along lines extending generally arcuately and obliquely across a plane that is normal to the wheel axis and midway between the inner and outer edges of said rim seating surfaces, so that the web segments form braces extending diagonally from the hub to the peripheral end walls of the spokes for stiffening the spokes against axially directed forces, the portions of each side wall of each spoke channel on opposite sides of said web segments being substantially in coplanar alignment and both of said portions extending uninterruptedly from the hub to said end walls of the spokes to provide substantially aligned inner and outer stiffening wall portions extending from the hub to said end walls of the spokes to resist both radially directed forces on the spokes on either side of said median plane and axially directed forces on the spokes, and the bottom walls of the spoke channels over their entire length from the hub to said end walls of the spokes being spaced axially outwardly beyond all parts of said web segments.

4. A light metal alloy dual tire wheel having inner and outer sides and comprising, as an integral casting, a tubular hub and a wheel body extending radially outwardly from and circumferentially about the hub, said body including a multiplicity of spokes in the form of channels opening to the inner side of the wheel and extending radially from the hub, and intervening webs in the form of outwardly convex generally spheroidal segments extending radially outwardly from the hub and connecting adjacent spokes for resisting tangential forces on the spokes, the peripheral ends of said spoke channels being closed by end walls forming a multiplicity of circumferentially spaced rim seating surfaces conforming to a cylindrical surface of revolution, said web segments, adjacent the spokes, being joined to side walls of adjacent spoke channels from the hub to the outer end walls of the spokes along lines extending generally arcuately and obliquely across a median plane that is normal to the wheel axis and midway between the inner and outer edges of said rim seating surfaces, so that the web segments form braces extending diagonally from the hub to the peripheral end walls of the spokes for stiffening the spokes against axially directed forces, the portions of each side wall of each spoke channel on opposite sides of said web segments being substantially in coplanar alignment and both of said portions extending uninterruptedly from the hub to said end walls of the spokes to provide substantially aligned inner and outer stiffening wall portions extending from the hub to said end walls of the spokes to resist both radially directed forces on the spokes on either side of said median plane and axially directed forces on the spokes, the channel side walls extending axially in both directions beyond said web segments and said median plane from the hub to the outer end walls of the spokes.

5. A cast metal dual tire wheel having inner and outer sides and comprising, as an integral casting, a tubular hub and a wheel body extending radially from and circumferentially about the hub, said body including a multiplicity of rim seating spokes in the form of radially extending inwardly opening channels, said spoke channels being circumferentially spaced at the hub and extending in radially diverging relationship to the periphery of the wheel, the peripheral ends of the spokes being closed by end walls forming a corresponding multiplicity of circumferentially spaced rim seating surfaces conforming to a cylindrical surface of revolution, and intervening webs that are joined to the hub and to the spokes and extend radially outwardly from the hub for connecting adjacent spokes and resisting tangential forces thereon, said webs being connected to the opposed side walls of adjacent spoke channels continuously from the hub to the end walls of the spokes along lines of connection that extend obliquely across a median plane of the wheel normal to the wheel axis and midway between the inner and outer edges of said rim seating surfaces so that the webs form diagonal braces for stiffening the spokes against axially directed forces, said webs joining the hub on the outer side of said median plane inwardly of the outer walls of the spokes and extending radially along the spokes to the inner edges of the spoke end walls on the opposite side of said median plane so as to reinforce the spokes over their full lengths from the hub to their peripheral ends.

6. A cast metal dual tire wheel having inner and outer sides and comprising, as an integral casting, a tubular hub and a wheel body extending radially from and circumferentially about the hub, said body including a multiplicity of rim seating spokes in the form of radially extending inwardly opening channels, said spoke channels being circumferentially spaced at the hub and extending in radially diverging relationship to the periphery of the wheel, the peripheral ends of the spokes being closed by end walls forming a corresponding multiplicity of circumferentially spaced rim seating surfaces conforming to a cylindrical surface of revolution, and intervening webs that are joined to the hub and to the spokes and extend radially outwardly from the hub for connecting adjacent spokes and resisting tangential forces thereon, said webs being connected to the opposed side walls of adjacent spoke channels continuously from the hub to the end walls of the spokes along lines of connection that extend obliquely across a median plane of the wheel normal to the wheel axis and midway between the inner and outer edges of said rim seating surfaces so that the webs form diagonal braces for stiffening the spokes against axially directed forces, said webs joining the hub on the outer side of said median plane and extending radially along the spokes to the inner edges of the spoke end walls on the opposite side of said median plane so as to reinforce the spokes over their full lengths from the hub to their peripheral ends, the outer bottom walls of the spoke channels flaring axially inwardly from the hub to the peripheral ends thereof at a small angle of inclination to planes normal to the wheel axis, said inclination being in the same direction as but substantially less than the corresponding inclination of said webs.

7. A cast metal dual tire wheel having inner and outer sides and comprising, as an integral casting, a tubular hub and a wheel body extending radially from and circumferentially about the hub, said body including a multiplicity of rim seating spokes in the form of radially extending inwardly opening channels, said spoke channels being circumferentially spaced at the hub and extending in radially diverging relationship to the periphery of the wheel, the peripheral ends of the spokes being closed by end walls forming a corresponding multiplicity of circumferentially spaced rim seating surfaces conforming to a cylindrical surface of revolution, and intervening webs that are joined to the hub and to the spokes and extend radially outwardly from the hub for connecting adjacent spokes and resisting tangential forces thereon, said webs being connected to the opposed side walls of adjacent spoke channels continuously from the hub to the end walls of the spokes along lines of connection that extend obliquely across a median plane of the wheel normal to the wheel axis and midway between the inner and outer edges of said rim seating surfaces so that the webs form diagonal braces for stiffening the spokes against axially directed forces, said webs joining the hub on the outer side of said median plane and extending radially along the spokes to the inner edges of the spoke end walls on the opposite side of said median plane so as to reinforce the spokes over their full lengths from the hub to their peripheral ends, each spoke end wall having a circumferentially extending inner rim positioning ledge along its inner edge that projects radially beyond said rim seating surface, and an axially elongated stud receiving boss joined to and extending along the radially inner surface of each spoke end wall from the outer bottom wall of the spoke to adjacent the inner edge of the spoke end wall, a stud receiving bore extending axially into said boss from the outer face of the spoke to adjacent the inner end of the boss, the inner end of said bore being threaded to grip a stud screwed therein for mounting an outer rim positioning clamp, whereby said boss reinforces the outer ends of the spokes and tension stresses on said stud are transmitted to said boss.

8. A cast metal dual tire wheel having inner and outer sides and comprising, as an integral casting, a tubular hub and a wheel body extending radially from and circumferentially about the hub, said body including a multiplicity of rim seating spokes in the form of radially extending inwardly opening channels, said spoke channels being circumferentially spaced at the hub and extending in radially diverging relationship to the periphery of the wheel, the peripheral ends of the spokes being closed by end walls forming a corresponding multiplicity of circumferentially spaced rim seating surfaces conforming to a cylindrical surface of revolution, and intervening webs that are joined to the hub and to the spokes and extend radially outwardly from the hub for connecting adjacent spokes and resisting tangential forces thereon, said webs being connected to the opposed side walls of adjacent spoke channels continuously from the hub to the end walls of the spokes along lines of connection that extend obliquely across a median plane of the wheel normal to the wheel axis and midway between the inner and outer edges of said rim seating surfaces so that the webs form diagonal braces for stiffening the spokes against axially directed forces, said webs joining the hub on the outer side of said median plane and extending radially along the spokes to the inner edges of the spoke end walls on the opposite side of said median plane so as to reinforce the spokes over their full lengths from the hub to their peripheral ends, said hub having hollow projections on its periphery disposed between said spokes and joined to said webs to provide brake drum attaching bosses, said projections including wall portions extending from adjacent the inner end of the hub to the inner surfaces of the webs at points on the webs spaced radially outwardly from the hubs, said wall portions being generally inclined oppositely to the inclination of the webs relative to said median plane whereby said webs and wall portions form intersecting diagonal braces that cooperate in resisting axial thrusts applied to the spokes.

9. A cast metal dual tire wheel having inner and outer sides and comprising, as an integral casting, a tubular hub and a wheel body extending radially from and circumferentially about the hub, said body including a multiplicity of rim seating spokes in the form of radially extending inwardly opening channels, said spoke channels being circumferentially spaced at the hub and extending in radially diverging relationship to the periphery of the wheel, the peripheral ends of the spokes being closed by end walls forming a corresponding multiplicity of circumferentially spaced rim seating surfaces conforming to a cylindrical surface of revolution, and intervening webs that are joined to the hub and to the spokes and extend radially outwardly from the hub for connecting adjacent spokes and resisting tangential forces thereon, said webs being connected to the opposed side walls of adjacent spoke channels continuously from the hub to the end walls of the spokes along lines of connection that extend obliquely across a median plane of the wheel normal to the wheel axis and midway between the inner and outer edges of said rim seating surfaces so that the webs form diagonal braces for stiffening the spokes against axially directed forces, said webs joining the hub on the outer side of said median plane and extending radially along the spokes to the inner edges of the spoke end walls on the opposite side of said median plane so as to reinforce the spokes over their full lengths from the hub to their peripheral ends, said hub having hollow projections on its periphery disposed between said spokes and joined to said webs to provide brake drum attaching bosses projecting radially inwardly from the inner surfaces of the webs, said projections including wall portions extending from points on the hub axially inward of said rim seating surfaces to points on the inner surfaces of the webs spaced radially outwardly from the hubs, said wall portions and said webs forming generally oppositely inclined, intersecting, diagonal braces that cooperate to resist axial thrusts applied to the spokes.

References Cited in the file of this patent
UNITED STATES PATENTS

| | | |
|---|---|---|
| 2,016,435 | Isidin | Oct. 8, 1935 |
| 2,041,996 | Eksergian | May 26, 1936 |
| 2,511,144 | Ash | June 13, 1950 |
| 2,564,158 | Forbes | Aug. 14, 1951 |